(12) United States Patent
Takehana et al.

(10) Patent No.: US 10,503,057 B2
(45) Date of Patent: Dec. 10, 2019

(54) PROJECTION LENS AND PROJECTOR

(71) Applicant: SEIKO EPSON CORPORATION, Tokyo (JP)

(72) Inventors: Naoto Takehana, Matsumoto (JP); Koji Shiokawa, Azumino (JP); Takateru Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/260,208

(22) Filed: Jan. 29, 2019

(65) Prior Publication Data

US 2019/0235362 A1   Aug. 1, 2019

(30) Foreign Application Priority Data

Jan. 30, 2018   (JP) ................................ 2018-013831

(51) Int. Cl.
  *G03B 21/14* (2006.01)
  *G02B 7/02* (2006.01)
  *G02B 9/64* (2006.01)
(52) U.S. Cl.
  CPC .......... *G03B 21/142* (2013.01); *G02B 7/021* (2013.01); *G02B 7/025* (2013.01); *G02B 9/64* (2013.01)

(58) Field of Classification Search
  CPC ...... G03B 21/142; G02B 7/021; G02B 7/023; G02B 7/025
  USPC .......................... 359/813, 828, 649, 650, 651
  See application file for complete search history.

(56) References Cited

U.S. PATENT DOCUMENTS

2015/0036039 A1\* 2/2015 Nagao ...................... G02B 7/10
  348/345

FOREIGN PATENT DOCUMENTS

JP      2002-014267 A      1/2002

\* cited by examiner

*Primary Examiner* — Ryan D Howard
(74) *Attorney, Agent, or Firm* — Oliff PLC

(57) ABSTRACT

A projection lens includes a plurality of lens groups each formed of at least one lens, and a lens barrel adapted to support each of the lens groups from an outer circumferential side. The lens barrel includes a first temporarily holding mechanism allowing the first lens group located at an end on a enlargement side to be displaced in a direction perpendicular to the optical axis, a first adhesive applied to the first temporarily holding mechanism to fix the first lens group so as to be unable to be displaced, a second temporarily holding mechanism allowing the seventh lens group located at an end on a reduction side to be displaced in a direction perpendicular to the optical axis, and a second adhesive applied to the second temporarily holding mechanism to fix the seventh lens group so as to be unable to be displaced.

20 Claims, 10 Drawing Sheets

PROJECTION LENS AND PROJECTOR

BACKGROUND

1. Technical Field

The present invention relates to a projection lens provided with a lens barrel and a plurality of lens groups held by the lens barrel, and a projector for projecting an image displayed on an image display element using the projection lens.

2. Related Art

A lens unit equipped with a lens barrel and a plurality of lens groups held by the lens barrel is described in JP-A-2002-14267. In the lens unit of that document, the lens barrel is provided with a holding frame for holding a first lens group located on the side nearest to an object from the outer circumferential side, a main body for holding other lens groups than the first lens group from the outer circumferential side, and an aligning mechanism for performing alignment of the first lens group. The holding frame is attached to an end surface on the object side of the main body via the aligning mechanism. The aligning mechanism allows the holding frame to be displaced with respect to the main body.

In a projection lens of a projector for projecting an image displayed on an image display element on a screen, if it is made possible to align the first lens group located at an end on the enlargement side, an aberration can be prevented from occurring. However, it is insufficient for the alignment of the first lens group alone to suppress the aberration in some cases. In such a case, lens sensitivity reduction design and an improvement in the component accuracy of the lens barrel for holding each of the lens groups become necessary.

SUMMARY

An advantage of some aspects of the invention is to provide a projection lens capable of further preventing the aberration from occurring by the alignment of the lens groups. Another advantage of some aspects of the invention is to provide a projector for projecting an image with such a projection lens.

A projection lens according to an aspect of the invention includes a plurality of lens groups each formed of at least one lens, and a lens barrel adapted to support each of the lens groups from an outer circumferential side, wherein the lens barrel includes a first lens group holding barrel adapted to hold a first lens group located on an extreme enlargement side from the outer circumferential side, a final lens group holding barrel adapted to hold a final lens group located on an extreme reduction side from the outer circumferential side, an outer barrel adapted to hold the first lens group holding barrel and the final lens group holding barrel from an outer circumferential side, a first temporarily holding mechanism adapted to allow the first lens group to be displaced in a direction perpendicular to an optical axis, a first adhesive adapted to bond the first lens group holding barrel and the outer barrel to each other to make the first lens group unable to be displaced, a second temporarily holding mechanism adapted to allow the final lens group to be displaced in a direction perpendicular to the optical axis, and a second adhesive adapted to bond the final lens group holding barrel and the outer barrel to each other to make the final lens group unable to be displaced.

In the aspect of the invention, the lens barrel for supporting the plurality of lens groups from the outer circumferential side is provided with the first temporarily holding mechanism allowing the displacement of the first lens group, and the second temporarily holding mechanism allowing the displacement of the final lens group. Therefore, on the projection lens, it is possible to perform the alignment for displacing the first lens group and the alignment for displacing the final lens group in a manufacturing process thereof. Thus, it becomes possible to prevent the aberration from occurring compared to the case of performing the alignment by displacing only the first lens group. Further, since the lens barrel is provided with the first adhesive for bonding the first lens group holding barrel and the outer barrel to make the first lens group unable to be displaced, and the second adhesive for bonding the final lens group holding barrel and the outer barrel to make the final lens group unable to be displaced, it is possible to prevent the first lens group and the final lens group from being displaced after the alignment has been performed. Here, if the alignment (a shift adjustment) for displacing the final lens group in directions perpendicular to the optical axis is performed, it is possible to improve the resolution performance around the center of the image to be projected.

In the aspect of the invention, it is desirable that the first temporarily holding mechanism allows the first lens group to be displaced in the direction of the optical axis, and allows the first lens group to be displaced in a direction tilted from a plane perpendicular to the optical axis. According to this configuration, it is possible to perform the alignment (the tilt alignment) for displacing the first lens group in a direction tilted from the plane perpendicular to the optical axis, and the alignment (the back and forth adjustment) for displacing the first lens group in the direction of the optical axis in addition to the alignment (the shift adjustment) for displacing the first lens group in the directions perpendicular to the optical axis. Further, if these alignment operations are performed on the first lens group, it is possible to prevent field inclination of the projection image from occurring to thereby improve the resolution performance.

In the aspect of the invention, in order to hold the first lens group and the final lens group in the lens barrel, it is desirable for the lens barrel to include a first lens group holding barrel adapted to hold the first lens group from an outer circumferential side, a final lens group holding barrel adapted to hold the final lens group from an outer circumferential side, and an outer barrel adapted to hold the first lens group holding barrel and the final lens group holding barrel from an outer circumferential side.

In the aspect of the invention, the projection lens may be configured such that the first lens group holding barrel includes a holding barrel main body adapted to hold the first lens group, and a support barrel held by the outer barrel and adapted to hold the holding barrel main body from an outer circumferential side, the first temporarily holding mechanism includes a holding barrel main body side outer circumferential surface part opposed to the support barrel on an outer circumferential surface of the holding barrel main body, a support barrel side inner circumferential surface part opposed to the holding barrel main body side outer circumferential surface part on an inner circumferential surface of the support barrel, a first circular arc groove disposed in one of the holding barrel main body side outer circumferential surface part and the support barrel side inner circumferential surface part, and extending in a circumferential direction around the optical axis, and a first projection disposed in the other of the holding barrel main body side outer circumferential surface part and the support barrel side inner circumferential surface part, and inserted in the first circular arc groove, a gap is provided between the holding barrel main body side outer circumferential surface part and the support barrel side inner circumferential surface part, a gap is provided between a bottom surface of the first circular arc groove and a tip of the first projection, a gap is provided between the first projection and at least one of a pair of side wall surfaces opposed to each other in the direction of the optical axis in the first circular arc groove, and the first adhesive fixes the holding barrel main body and the support barrel. According to this configuration, since it is possible to allow the holding barrel main body to be displaced with respect to the support barrel held by the outer barrel, it is possible to allow the first lens group held by the holding barrel main body to be displaced. Further, since the first projection is inserted in the first circular arc groove, it is possible to prevent the holding barrel main body for holding the first lens group from dropping in the direction of the optical axis from the support barrel when displacing the holding barrel main body with respect to the support barrel. Further, by fixing the holding barrel main body to the support barrel with the first adhesive so as not to be displaced, it is possible to make the first lens group unable to be displaced.

In the aspect of the invention, the projection lens may be configured such that the outer barrel has a helicoid mechanism adapted to displace the first lens group holding barrel, and the helicoid mechanism includes an external thread disposed on an outer circumferential surface of the support barrel, and an internal thread disposed on an inner circumferential surface opposed to the outer circumferential surface of the support barrel, and is screwed in the external thread. According to this configuration, it becomes possible to move the first lens group in the direction of the optical axis for the focusing operation and so on after performing the alignment of the first lens group.

In the aspect of the invention, the projection lens may be configured such that the second temporarily holding mechanism includes a holding barrel side outer circumferential surface part opposed to the outer barrel on an outer circumferential surface of the final lens group holding barrel, an outer barrel side inner circumferential surface part opposed to the holding barrel side outer circumferential surface part on an inner circumferential surface of the outer barrel, a second circular arc groove disposed in one of the holding barrel side outer circumferential surface part and the outer barrel side inner circumferential surface part, and extending in a circumferential direction around the optical axis, and a second projection disposed in the other of the holding barrel side outer circumferential surface part and the outer barrel side inner circumferential surface part, and inserted in the second circular arc groove, a gap is provided between the holding barrel side outer circumferential surface part and the outer barrel side inner circumferential surface part, a gap is provided between a bottom surface of the second circular arc groove and a tip of the second projection, a pair of side wall surfaces of the second circular arc groove opposed to each other in the direction of the optical axis and the second projection have contact with each other, and the second adhesive fixes the final lens group holding barrel and the outer barrel. According to this configuration, since it is possible to allow the final lens group holding barrel to be displaced with respect to the outer barrel, it is possible to allow the final lens group held by the final lens group holding barrel to be displaced. Further, since the second projection is inserted in the second circular arc groove, it is possible to prevent the final lens group holding barrel for holding the final lens group from dropping in the direction of the optical axis from the outer barrel when displacing the final lens group holding barrel with respect to the outer barrel. Further, since a pair of side wall surfaces of the second circular arc groove and the second projection have contact with each other, the displacement of the final lens group holding barrel with respect to the outer barrel can be limited to the directions perpendicular to the optical axis. Further, by fixing the final lens group holding barrel to the outer barrel with the second adhesive so as not to be displaced, it is possible to make the final lens group unable to be displaced.

In the aspect of the invention, the projection lens may be configured such that the second circular arc groove is disposed in the outer barrel side inner circumferential surface part, the second projection is disposed in the holding barrel side outer circumferential surface part, the outer barrel side inner circumferential surface part is provided with an introduction groove adapted to introduce the second projection into the second circular arc groove, and the introduction groove extends from a part in a circumferential direction of the second circular arc groove toward the reduction side in the direction of the optical axis, and opens in an edge on the reduction side of the outer barrel. According to this configuration, it is easy to set the second projection provided to the final lens group holding barrel to the state of being inserted in the second circular arc groove provided to the outer barrel.

In the aspect of the invention, it is desirable that the outer barrel is provided with an adhesive-through hole adapted to inject the second adhesive into a part overlapping the final lens group holding barrel when viewed from a radial direction perpendicular to the optical axis. According to this configuration, since it is easy to apply the second adhesive to the holding barrel side outer circumferential surface, it becomes easy to fix the final lens holding barrel and the outer barrel to each other.

In the aspect of the invention, it is desirable that the outer barrel is provided with an aligning pin-through hole adapted to insert an aligning pin into a part overlapping the holding barrel side outer circumferential surface part when viewed from a redial direction perpendicular to the optical axis, and the holding barrel side outer circumferential surface part is provided with a flat surface at a position overlapping the aligning pin-through hole when viewed from the radial direction. According to this configuration, it is possible to make the tip of the aligning pin inserted in the aligning pin-through hole have contact with the flat surface of the final lens group holding barrel to thereby displace the final lens group holding barrel in the directions perpendicular to the optical axis. Therefore, it is possible to accurately perform the alignment of the final lens group.

In the aspect of the invention, it is desirable that the outer barrel is provided with a cutout part shaped like a circular arc extending in a circumferential direction in an edge on the reduction side, and the final lens group holding barrel is provided with a protruding part protruding toward an outer circumference and inserted in the cutout part. According to this configuration, it is possible to insert the final lens group holding barrel from the reduction side on the inner circumferential side of the outer barrel in the state of putting the fingers on the tip of the protruding part. Thus, it becomes easy to insert the final lens group holding barrel on the inner circumferential side of the outer barrel.

In the aspect of the invention, it is possible that there is further included an intermediate lens group located between the first lens group and the final lens group in the direction of the optical axis, the lens barrel includes an intermediate lens group holding barrel adapted to hold the intermediate lens group from an outer circumferential side, and a cam barrel located between the intermediate lens group holding barrel and the outer barrel, and adapted to support the intermediate lens group holding barrel so as to be movable in the direction of the optical axis, the intermediate lens group holding barrel is provided with a guide pin projecting outward, the cam barrel is provided with a cam hole tilted in the direction of the optical axis toward a circumferential direction, the outer barrel supports the cam barrel so as to be rotatable around the optical axis, and is provided with a guide groove extending in the direction of the optical axis in an inner circumferential surface, and the guide pin penetrates the cam hole and is inserted in the guide groove. According to this configuration, by rotating the cam barrel around the optical axis, it is possible to move the intermediate lens group in the direction of the optical axis between the first lens group and the final lens group. Therefore, it becomes easy to provide the zoom function to the projection lens due to the translation of the intermediate lens group.

In the aspect of the invention, the projection lens may be configured such that the second temporarily holding mechanism allows the final lens group to be displaced in the direction of the optical axis, and allows the final lens group to be displaced in a direction tilted from a plane perpendicular to the optical axis. According to this configuration, it is possible to perform the alignment (the tilt alignment) for displacing the final lens group in the direction tilted from the plane perpendicular to the optical axis, and the alignment (the back and forth adjustment) for displacing the final lens group in the direction of the optical axis in addition to the alignment (the shift adjustment) for displacing the final lens group in the directions perpendicular to the optical axis.

A projector according to an aspect of the invention includes anyone of the projection lenses described above, and an image display element, and an image displayed on the image display element is projected by the projection lens.

According to the aspects of the invention, since the aberration is prevented from occurring in the projection lens, it is possible to improve the resolution performance of the projection image projected via the projection lens.

BRIEF DESCRIPTION OF THE DRAWINGS

The invention will be described with reference to the accompanying drawings, wherein like numbers reference like elements.

DESCRIPTION OF AN EXEMPLARY EMBODIMENT

A projection lens and a projector according to an embodiment of the invention will hereinafter be described with reference to the accompanying drawings.

Projector

Figure 1:
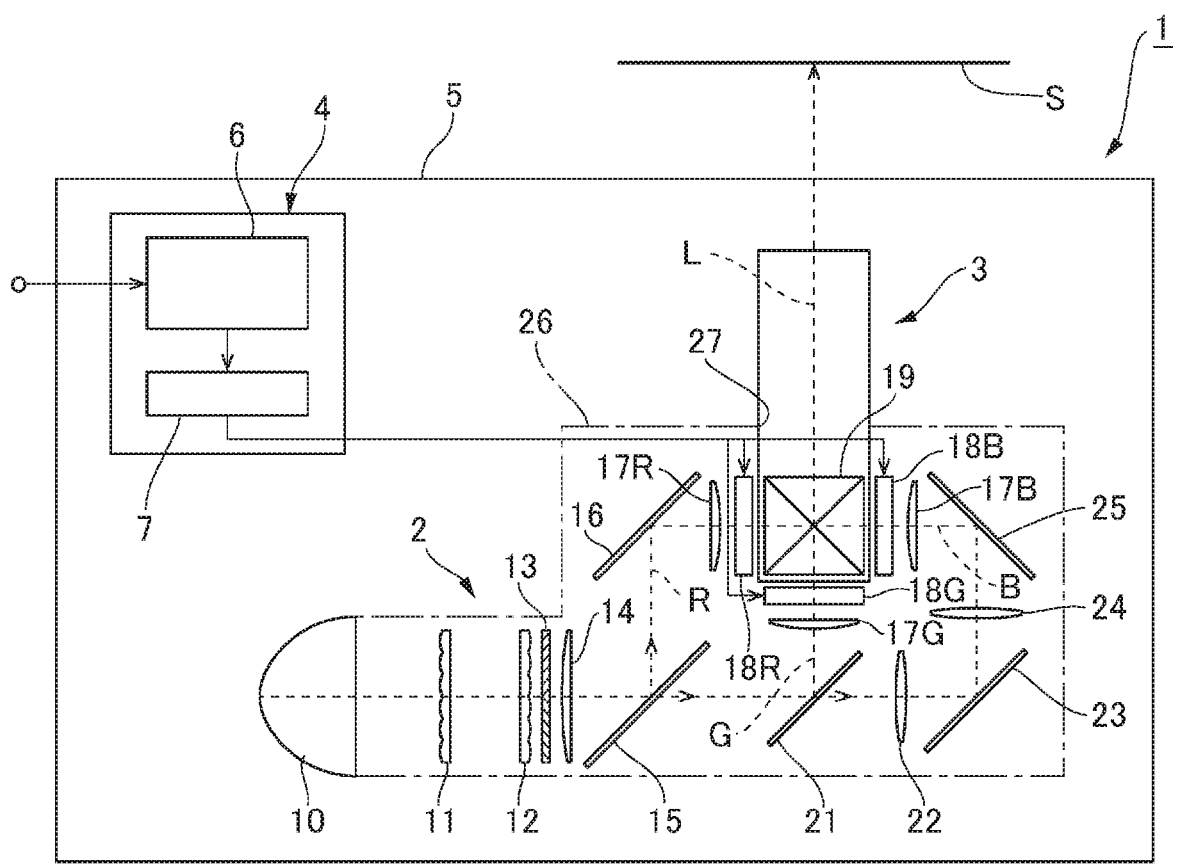
FIG. 1 is a schematic configuration diagram of a projector equipped with a projection lens according to the invention.

FIG. 1 is a schematic configuration diagram of the projector equipped with the projection lens according to the invention. As shown in FIG. 1, the projector 1 is provided with an image light generation optical system. 2 for generating image light to be projected on a screen S, a projection lens 3 for projecting the image light in an enlarged manner, and a control section 4 for controlling an operation of the image light generation optical system 2. The projection lens 3, the image light generation optical system 2 and the control section 4 are housed in a housing 5.

Image Light Generation Optical System and Control Section

The image light generation optical system 2 is provided with a light source 10, a first integrator lens 11, a second integrator lens 12, a polarization conversion element 13, and an overlapping lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding each of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image light generation optical system 2 is provided with a first dichroic mirror 15, a reflecting mirror 16 and a field lens 17R, and the liquid crystal panel 18R. The first dichroic mirror 15 reflects R light as a part of the light beam having entered the first dichroic mirror 15 from the superimposing lens 14, and transmits G light and B light each of which is a part of the light beam having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is an image display element. The liquid crystal panel 18R modulates the R light in accordance with an image signal to thereby form a red image.

Further, the image light generation optical system 2 is provided with a second dichroic mirror 21, a field lens 17G, and the liquid crystal panel 18G. The second dichroic mirror 21 reflects the G light as a part of the light beam from the first dichroic mirror 15, and transmits the B light as a part of the light beam from the first dichroic mirror 15. The G light having been reflected by the second dichroic mirror 21 enters the liquid crystal panel 18G via the field lens 17G. The liquid crystal panel 18G is the image display element.

The liquid crystal panel 18G modulates the G light in accordance with the image signal to thereby form a green image.

Further, the image light generation optical system 2 is provided with a relay lens 22, a reflecting mirror 23, a relay lens 24, a reflecting mirror 25 and a field lens 17B, and the liquid crystal panel 18G. The B light having been transmitted through the second dichroic mirror 21 enters the liquid crystal panel 18B via the relay lens 22, the reflecting mirrors 23, the relay lens 24, the reflecting mirror 25, and the field lens 17B. The liquid crystal panel 18B is the image display element. The liquid crystal panel 18B modulates the B light in accordance with the image signal to thereby form a blue image.

The liquid crystal panel 18R, the liquid crystal panel 18G, and the liquid crystal panel 18B surround the cross dichroic prism 19 from three directions. The cross dichroic prism 19 is a light combining prism, and combines the light modulated by the respective liquid crystal panels 18R, 18G and 18B with each other to generate the image light.

The projection lens 3 projects the image light (the image formed by the liquid crystal panels 18R, 18G and 18B) combined by the cross dichroic prism 19 on the screen S in an enlarged manner.

Here, the projector 1 is provided with a frame 26 for housing a light path of the light beam from the light source 10 and optical members disposed on the optical path inside. The frame 26 is provided with an opening section 27 at a position corresponding to the light path of the image light combined by the cross-dichroic prism 19. The projection lens 3 is fixed to an opening edge part of the opening part 27 in the frame 26. Details of the projection lens 3 will be described later.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signal output from the image processing section 6.

The image processing section 6 converts the image signal input from external equipment into the image signals including the tones and so on of the respective colors. The display drive section 7 makes the liquid crystal panel 18R, the liquid crystal panel 18G and the liquid crystal panel 18B operate based on the image signals of the respective colors output from the image processing section 6. Thus, the image processing section 6 displays the images corresponding to the image signals on the liquid crystal panel 18R, the liquid crystal panel 18G and the liquid crystal panel 18B, respectively.

Projection Lens

Figure 2:
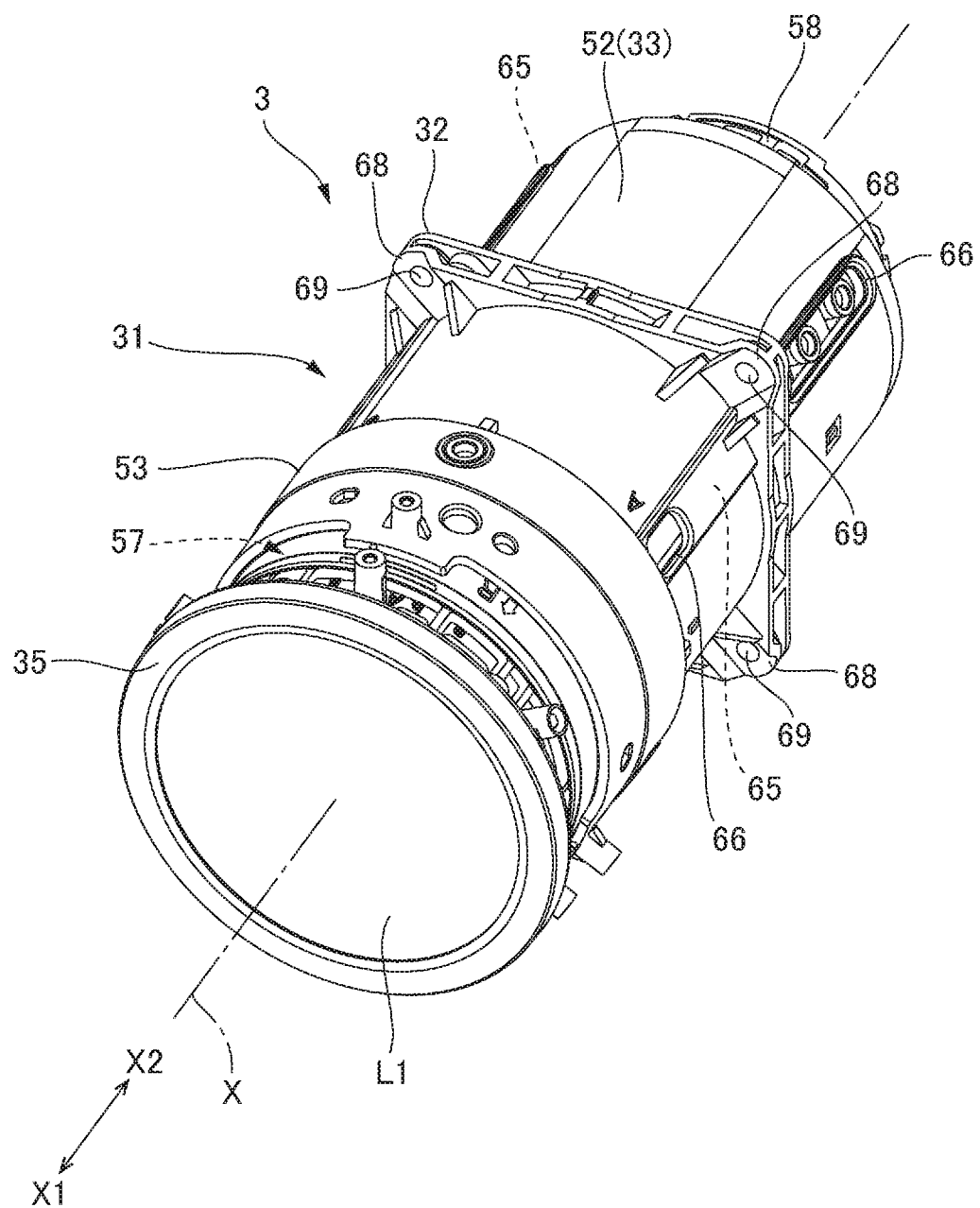
FIG. 2 is a perspective view of the projection lens viewed from the front side in a projection direction.
Figure 3:
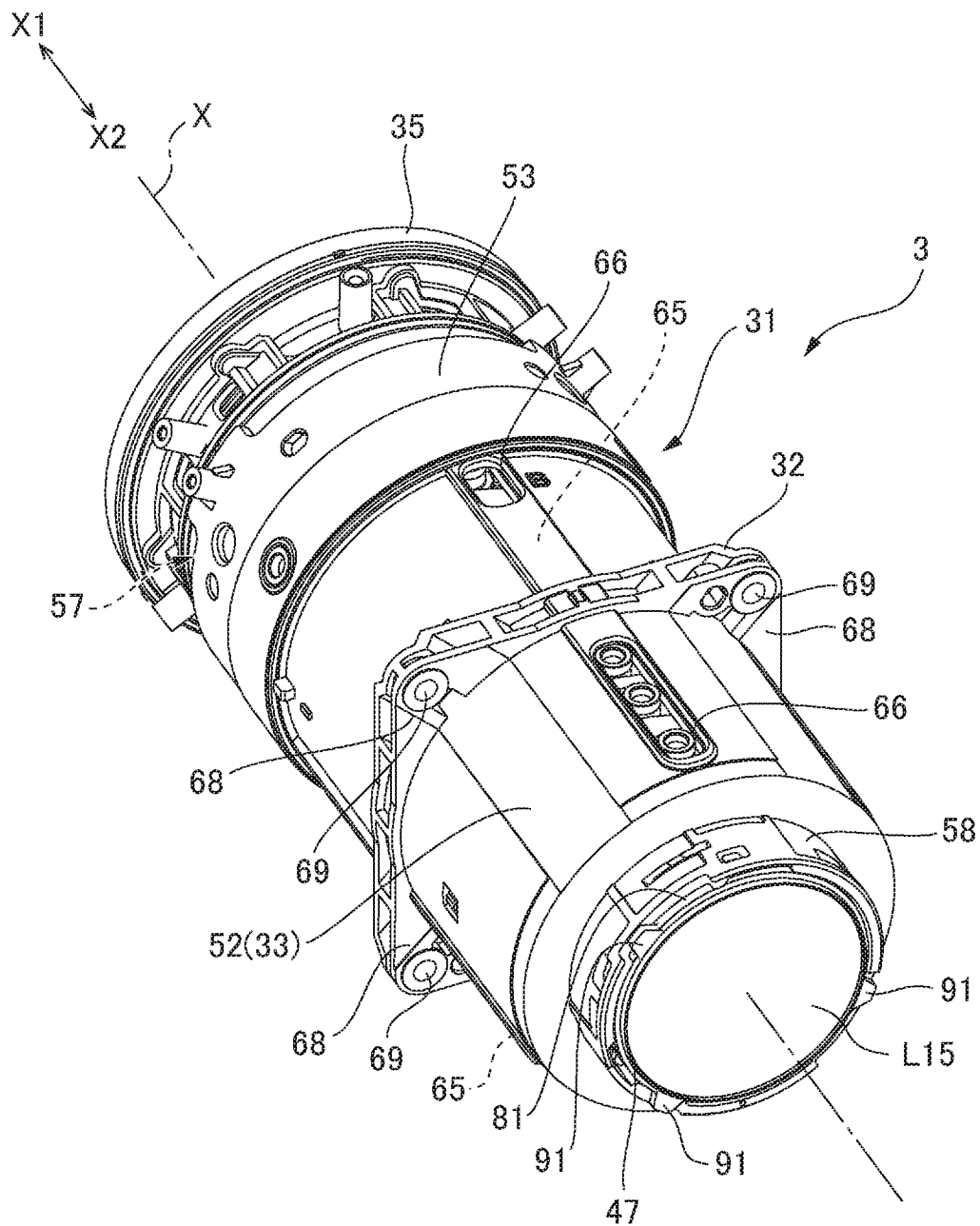
FIG. 3 is a perspective view of the projection lens viewed from the rear side in the projection direction.
Figure 4:
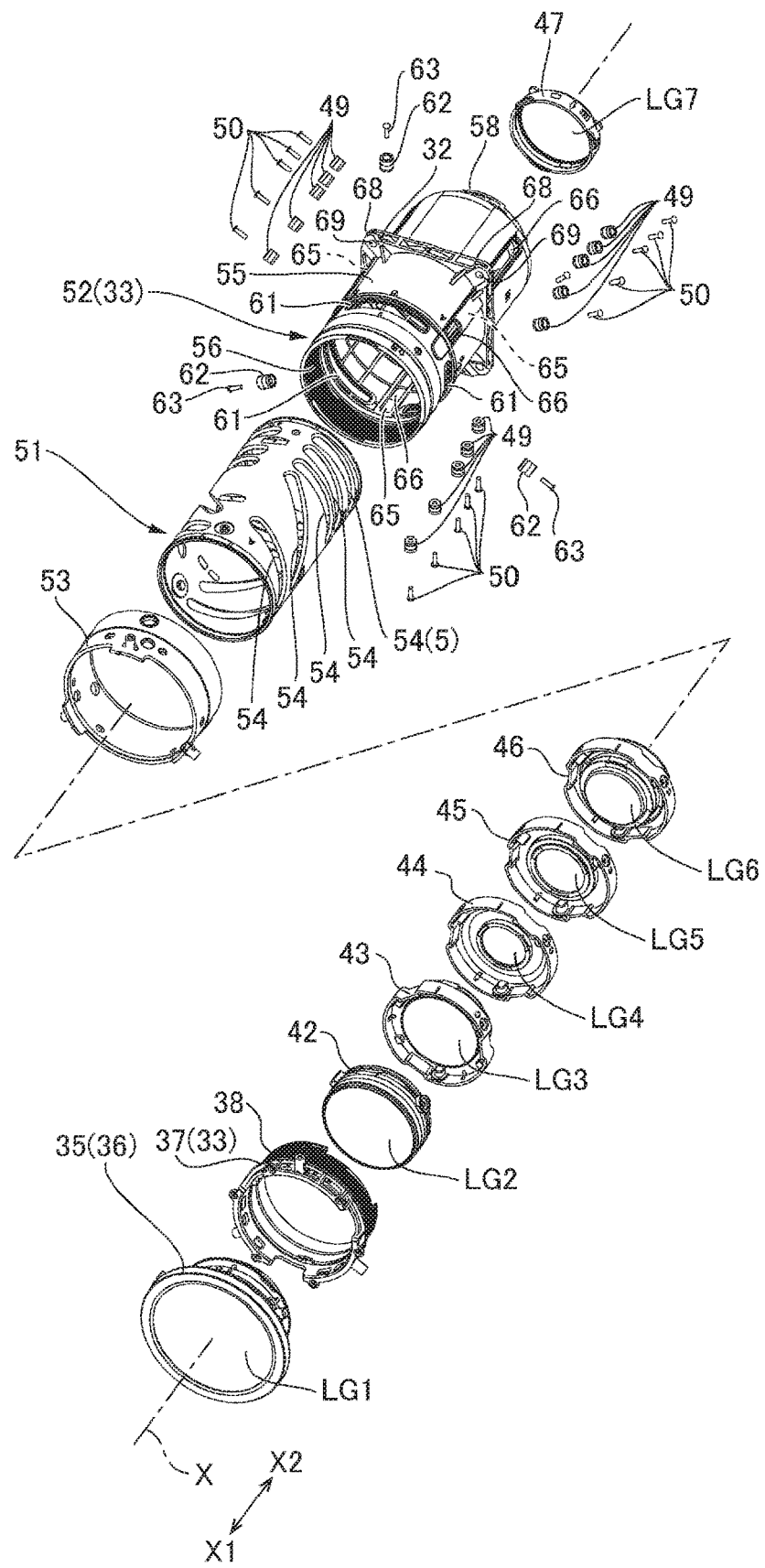
FIG. 4 is an exploded perspective view of the projection lens.
Figure 5:
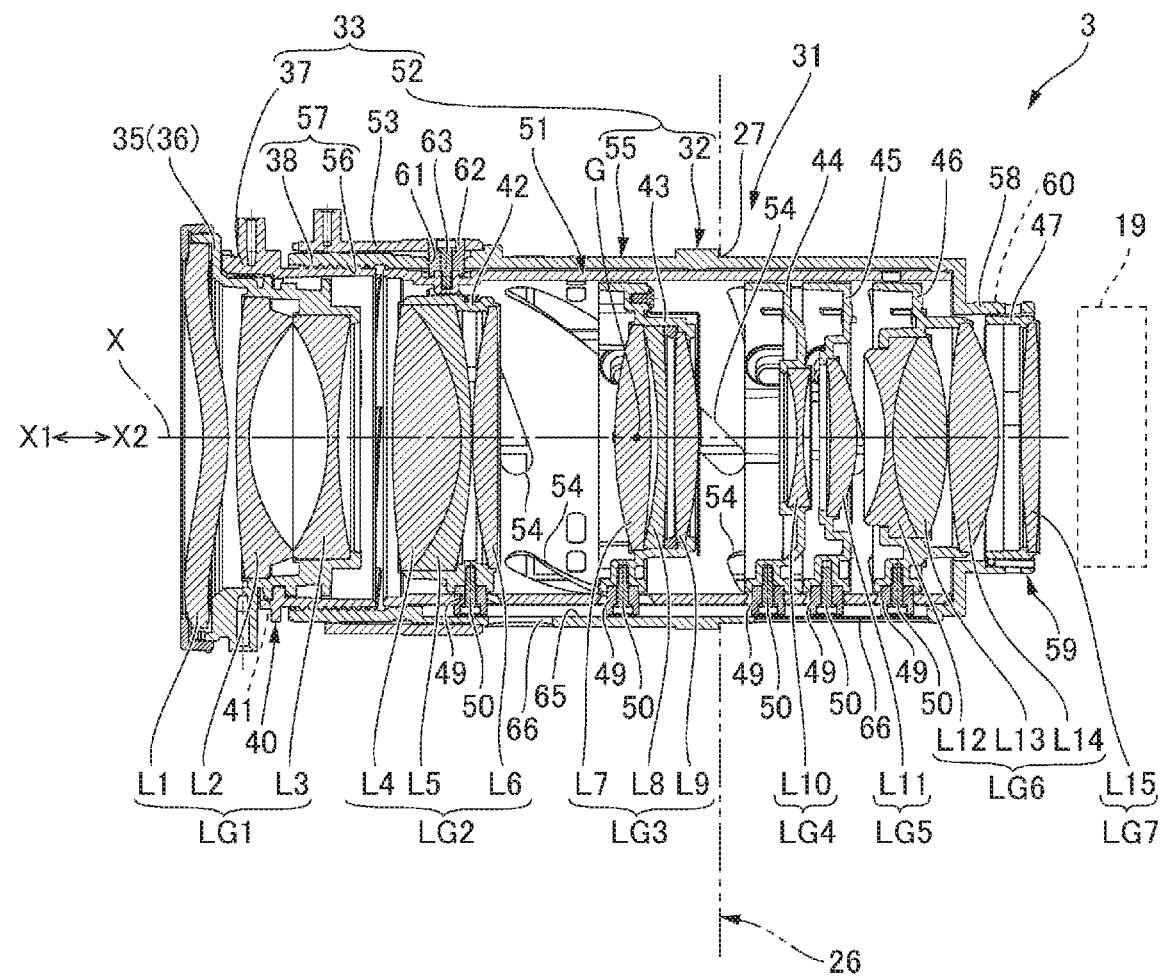
FIG. 5 is a cross-sectional view of the projection lens cut along the optical axis.

FIG. 2 is a perspective view of the projection lens viewed from the front side (a enlargement side) in a projection direction. FIG. 3 is a perspective view of the projection lens viewed from the rear side (a reduction side) in the projection direction. FIG. 4 is an exploded perspective view of the projection lens of the present embodiment. FIG. 5 is a cross-sectional view of the projection lens according to the invention cut along the optical axis. As shown in FIG. 2 and FIG. 3, the projection lens 3 is provided with a plurality of lenses L1 through L15, and a lens barrel 31 for holding these lenses L1 through L15 from the outer circumferential side. The lens barrel 31 is provided with a flange 32 projecting toward the outer circumference at an intermediate position in a direction of the optical axis X of the projection lens 3. In the following description, in the direction of the optical axis X of the projection lens 3, a side closer to the screen S (the enlargement side) is defined as the front side X1 in the projection direction, and a side closer to the cross dichroic prism 19 (the reduction side) is defined as the rear side X2 in the projection direction. Further, a direction perpendicular to the optical axis X is defined as a radial direction.

As shown in FIG. 5, the projection lens 3 is provided with 15 lenses L1 through L15. The first lens L1, a second lens L2 and a third lens L3 constitute a first lens group LG1. The first lens group LG1 is held by a first lens group holding barrel 35. The first lens group holding barrel 35 is provided with a holding barrel main body 36 for holding the first lens group LG1.

A fourth lens L4, a fifth lens L5 and a sixth lens L6 constitute a second lens group LG2. The second lens group LG2 is held by a second lens group holding barrel 42. A seventh lens L7, an eighth lens L8 and a ninth lens L9 constitute a third lens group LG3. The third lens group LG3 is held by a third lens group holding barrel 43. A tenth lens L10 constitutes a fourth lens group LG4. The fourth lens group LG4 is held by a fourth lens group holding barrel 44. An eleventh lens L11 constitutes a fifth lens group LG5. The fifth lens group LG5 is held by a fifth lens group holding barrel 45. A twelfth lens L12, a thirteenth lens L13 and a fourteenth lens L14 constitute a sixth lens group LG6. The sixth lens group LG6 is held by a sixth lens group holding barrel 46. A fifteenth lens L15 constitutes a seventh lens group LG7 (the final lens group). The seventh lens group LG7 is held by a seventh lens group holding barrel 47 (the final lens group holding barrel).

The second lens group LG2, the third lens group LG3, the fourth lens group LG4, the fifth lens group LG5 and the sixth lens group LG6 are each a movable lens group which moves in the direction of the optical axis X in a zoom operation for changing the projection size to the screen S. The second through sixth lens group holding barrels 42 through 46 for holding the movable lens groups are each provided with three guide pins 49 projecting outward in the radial direction. The guide pins 49 are attached to each of the lens group holding barrels 42 through 46 at regular angular intervals around the optical axis X. The guide pins 49 are each fixed to each of the lens group holding barrels 42 through 46 with a screw 50.

The lens barrel 31 for holding the lenses L1 through L15 is provided with the first through seventh lens group holding barrels 35, 42 through 47, a support barrel 37 for supporting the first lens group holding barrel 35 (the holding barrel main body 36) from the outer circumferential side and the rear side X2, a cam barrel 51, a guide barrel 52 and a zooming ring 53. The support barrel 37 is provided with an external thread 38 on the outer circumferential surface. The support barrel 37 is attached to a tip part of the guide barrel 52. The support barrel 37 and the guide barrel 52 constitute an outer barrel 33 for holding the first through seventh lens group holding barrels 35, 42 through 47 from the outer circumferential side.

Here, the lens barrel 31 is provided with a first temporarily holding mechanism 40 for allowing the first lens group LG1 to be displaced. In the present embodiment, the first temporarily holding mechanism 40 makes it possible for the first lens group to be displaced in directions perpendicular to the optical axis X, the direction of the optical axis X, and a direction tilted from a plane perpendicular to the optical axis X. Further, the lens barrel 31 is provided with a first adhesive 41 for bonding the first lens group holding barrel 35 (the holding barrel main body 36) and the outer barrel 33 to each other to thereby make it impossible for the first lens group LG1 to be displaced. The details of the first temporarily holding mechanism 40 and the first adhesive 41 will be described later.

The cam barrel 51 is located on the outer side in the radial direction of the second through sixth lens group holding barrels 42 through 46. The guide barrel 52 is located on the outer circumferential side of the first through seventh lens group holding barrels 35, 42 through 47, and at the same time located on the outer circumferential side of the cam barrel 51. The guide barrel 52 supports the cam barrel 51 so as to be able to rotate around the optical axis X. The zooming ring 53 is disposed on the outer circumferential side of a front part of the guide barrel 52. The zooming ring 53 is supported by the guide barrel 52 in the state of being capable of rotating around the optical axis X. The first through seventh lens group holding barrels 35, 42 through 47, the cam barrel 51, the guide barrel 52 and the zooming ring 53 are each a resin molding.

As shown in FIG. 4, the cam barrel 51 is provided with five cam holes 54 arranged in the direction of the optical axis X at three places separated at regular angular intervals around the optical axis X. Each of the cam holes 54 is tilted in the direction of the optical axis X toward the circumferential direction. The guide pins 49 of the second through sixth lens group holding barrels 42 through 46 for respectively holding the movable lens groups respectively penetrate the five cam holes 54. The second through sixth lens group holding barrels 42 through 46 are supported by the cam barrel 51 in the state of being movable in the direction of the optical axis X.

The guide barrel 52 is provided with a barrel main body 55 and a flange 32 projecting from the barrel main body 55 toward the outer circumference. The barrel main body 55 is provided with an internal thread 56 on an inner circumferential surface of the tip part thereof. The support barrel 37 is held by the guide barrel 52 with the external thread 38 thereof being screwed in the internal thread 56. The internal thread 56 of the guide barrel 52 and the external thread 38 of the support barrel 37 constitute a helicoid mechanism 57 for moving the first lens group LG1 in the direction of the optical axis X. The helicoid mechanism 57 is for moving the first lens group LG1 held by the first lens group holding barrel 35 in the direction of the optical axis X by rotating the support barrel 37 and the first lens group holding barrel 35 held by the support barrel 37 in a focusing operation. Further, the barrel main body 55 is provided with a small-diameter barrel part 58 in the rear part, the small-diameter barrel part 58 being small in outer diameter compared to the front part. The small-diameter barrel part 58 is a fixation part for fixing the seventh lens group holding barrel 47.

Here, the lens barrel 31 (the outer barrel 33 and the seventh lens group holding barrel 47) for holding the seventh lens group LG7 from the outer circumferential side is provided with a second temporarily holding mechanism 59 for allowing the seventh lens group LG7 to be displaced. In the present embodiment, the second temporarily holding mechanism 59 makes it possible for the seventh lens group LG7 to be displaced in the radial direction. Further, the lens barrel 31 is provided with a second adhesive 60 for bonding the outer barrel 33 (the guide barrel 52) and the seventh lens group holding barrel 47 to each other to thereby make it impossible for the seventh lens group LG7 to be displaced. The details of the second temporarily holding mechanism 59 and the second adhesive 60 will be described later.

Further, the barrel main body 55 is provided with three elongated holes 61 extending in the circumferential direction perpendicular to the optical axis X in the tip part thereof. The elongated holes 61 are disposed at regular angular intervals around the optical axis X. Here, the zooming ring 53 is disposed at a position where the zooming ring 53 covers the three elongated holes 61 from the outer circumferential side. Further, the zooming ring 53 is connected to the tip part of the cam barrel 51 with fixation pins 62 penetrating the respective elongated holes 61 in the radial direction. Therefore, when rotating the zooming ring 53 relatively to the guide barrel 52, the cam barrel 51 rotates integrally with the zooming ring 53. The zooming ring 53 and the cam barrel 51 can rotate in an angular range corresponding to the motion of the fixation pin 62 from one end to the other end in the circumferential direction of each of the elongated holes 61. It should be noted that the fixation pins 62 are fixed to the cam barrel 51 with respective screws 63.

Further, the barrel main body 55 is provided with three guide grooves 65 extending in the direction of the optical axis X on the inner circumferential surface thereof. The guide grooves 65 are disposed at three places separated at regular angular intervals around the optical axis X. In the guide grooves 65, there are respectively inserted the guide pins 49 of the second through sixth lens group holding barrels 42 through 46 from the inner circumferential side. Each of the guide grooves 65 is provided with penetration sections 66 penetrating in the redial direction respectively at the front part and the rear part thereof.

Here, a method of providing the guide pins 49 to the second through sixth lens group holding barrels 42 through 46 will be described. When providing the guide pins 49 to the second through sixth lens group holding barrels 42 through 46, firstly, the guide barrel 52 and the cam barrel 51 are rotated relatively to each other around the optical axis X to communicate the cam holes 54 of the can barrel 51 and the penetration sections 66 of the guide barrel 52 with each other in the radial direction. Then, the guide pins 49 are respectively inserted into the penetration sections 66 and the cam holes 54 from the outer circumferential side of the guide barrel 52. Subsequently, the guide pins 49 are fixed to pin fixation sections of the respective lens group holding barrels 42 through 46 located on the inner circumferential side of the cam barrel 51 using the screws 50. Here, in the case in which the respective guide pins 49 are fixed to the respective lens group holding barrels 42 through 46, an end on the outer circumferential side of each of the guide pins 49 penetrating the cam holes 54 to extend to the outer circumferential side of the cam barrel 51 is located on the inner circumferential side of a bottom surface of the guide groove 65.

The flange 32 is disposed at an intermediate position in the direction of the optical axis X of the guide barrel 52. The formation position of the flange 32 is closer to the centroid G of the projection lens 3 than to the front end and the rear end of the lens barrel 31. Further, the formation position of the flange 32 is located on the front side X1 of the cam hole 54 (5) located on the extreme rear side X2 (the reduction side) of the plurality of cam holes 54 provided to the cam barrel 51, and is closer to the centroid G than to the cam hole 54 (5). In the present embodiment, the flange 32 is located on the rear side X2 of the centroid G of the projection lens 3. Further, the flange 32 is disposed at a position different in the direction of the optical axis X from the penetration sections 66 of the respective guide grooves 65. In other words, in the direction of the optical axis X, the flange 32 is located between the penetration section 66 disposed in the front part of each of the guide grooves 65 and the penetration section 66 disposed in the rear part. It should be noted that the centroid G of the projection lens 3 moves in the direction of the optical axis X in accordance with the translation of the movable lens group in the zoom operation.

As shown in FIG. 2 and FIG. 3, a contour shape of the guide barrel 52 viewed from the direction of the optical axis X is a circle, and a contour shape of the flange 32 viewed from the direction of the optical axis X is a rectangle. Fixation holes 69 penetrating in the direction of the optical axis X are respectively disposed in four corner parts 68 of the flange 32 having the rectangular outline. The corner parts 68 of the flange 32 are disposed at different angular positions from those of the guide grooves 65 around the optical axis X. Therefore, the fixation holes 69 of the flange 32 and the penetration sections 66 of the guide barrel 52 are disposed at respective angular positions different from each other around the optical axis X.

As shown in FIG. 1 and FIG. 5, the projection lens 3 is fixed to the opening edge part of the opening part 27 of the frame 26. In other words, the projection lens 3 is set to the posture in which a part of the projection lens 3 located on the rear side of the flange 32 is inserted into the opening part 27 to make the flange 32 have contact with the opening edge part of the frame 26. Then, the projection lens 3 is fixed to the frame 26 with screws using the fixation holes 69 of the flange 32.

When changing the projection magnification by the projector 1, the zooming ring 53 is rotated. When the zooming ring 53 rotates, the cam barrel 51 rotates integrally with the zooming ring 53. When the cam barrel 51 rotates, the second through sixth lens group holding barrels 42 through 46 having the guide pins 49 inserted in the respective cam holes 54 are each urged to rotate around the optical axis X integrally with the cam barrel 51. Here, the end part on the outer circumferential side of each of the guide pins 49 is inserted in the guide groove 65 of the guide barrel 52. As a result, the second through sixth lens group holding barrels 42 through 46 move in the direction of the optical axis X along the cam holes 54 and the guide barrel 52. Therefore, when rotating the zooming ring 53, the movable lens groups (the second lens group LG2, the third lens group LG3, the fourth lens group LG4, the fifth lens group LG5 and the sixth lens group LG6) held by the second through sixth lens group holding barrels 42 through 46 move in the direction of the optical axis X to change the projection magnification.

Further, in the case of performing the focusing operation of the projector 1, the support barrel 37 of the outer barrel 33, and the first lens group holding barrel 35 held by the support barrel 37 are rotated. Here, the external thread 38 of the support barrel 37 and the internal thread 56 of the guide barrel 52 constitute the helicoid mechanism 57. Therefore, when rotating the support barrel 37 and the first lens group holding barrel 35, the first lens group LG1 held by the first lens group holding barrel 35 moves in the direction of the optical axis X. Thus, it is possible to perform the focusing operation.

First Temporarily Holding Mechanism and First Adhesive

Figure 6:
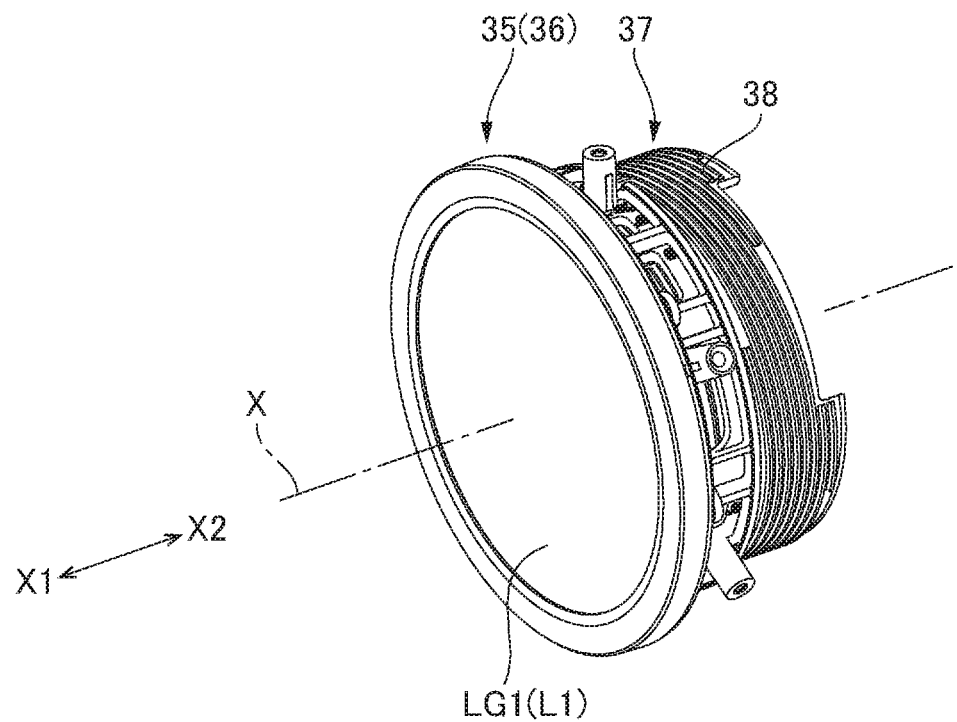
FIG. 6 is a perspective view of a first lens group and a first lens group holding barrel.
Figure 6:
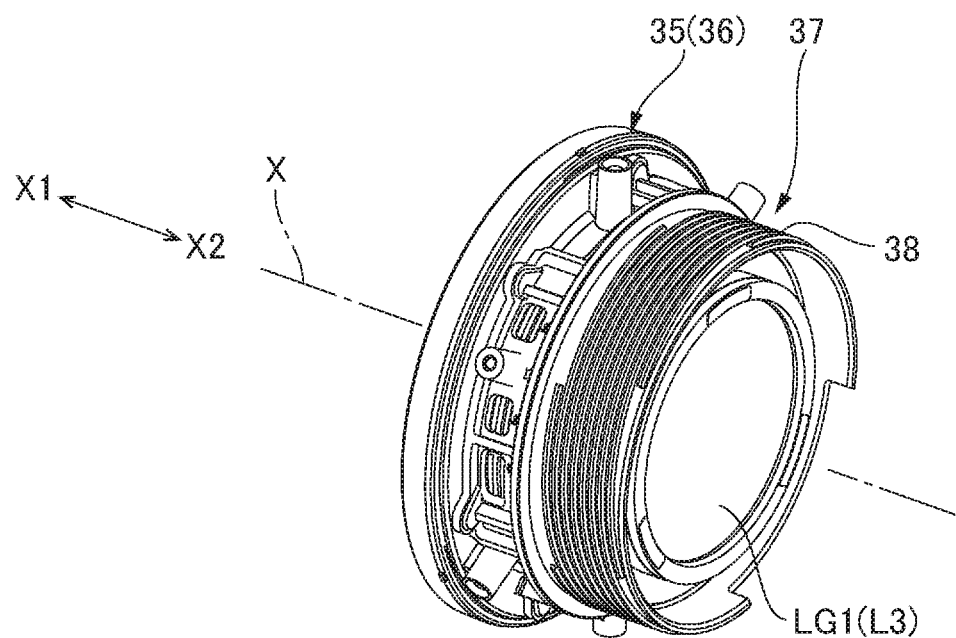
Figure 7:
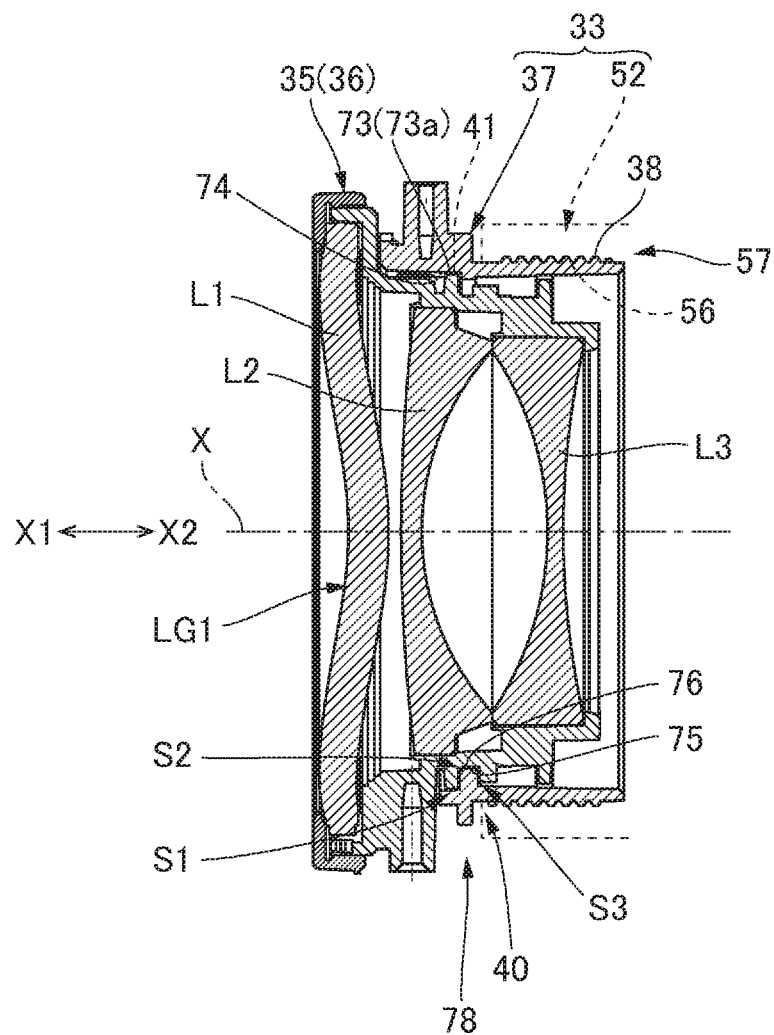
FIG. 7 is a cross-sectional view of the first lens group and the first lens group holding barrel.

Then the first temporarily holding mechanism 40 will be described with reference to FIG. 6 through FIG. 8. The drawing in the upper part of FIG. 6 is a perspective view of the first lens group LG1 and the first lens group holding barrel 35 viewed from the front side X1, and the drawing in the lower part is a perspective view of the first lens group LG1 and the first lens group holding barrel 35 viewed from the rear side X2. FIG. 7 is a cross-sectional view of the first lens group LG1 and the first lens group holding barrel 35. The drawing in the upper part of FIG. 8 is an exploded perspective view of the first lens group LG1 and the first lens group holding barrel 35 viewed from the front side X1, and the drawing in the lower part is an exploded perspective view of the first lens group LG1 and the first lens group holding barrel 35 viewed from the rear side X2.

Firstly, the first lens group holding barrel 35 is provided with the holding barrel main body 36 for holding the first lens group LG1. Further, the outer barrel 33 is provided with the support barrel 37 for holding the holding barrel main body 36 from the outer circumferential side.

Figure 8:
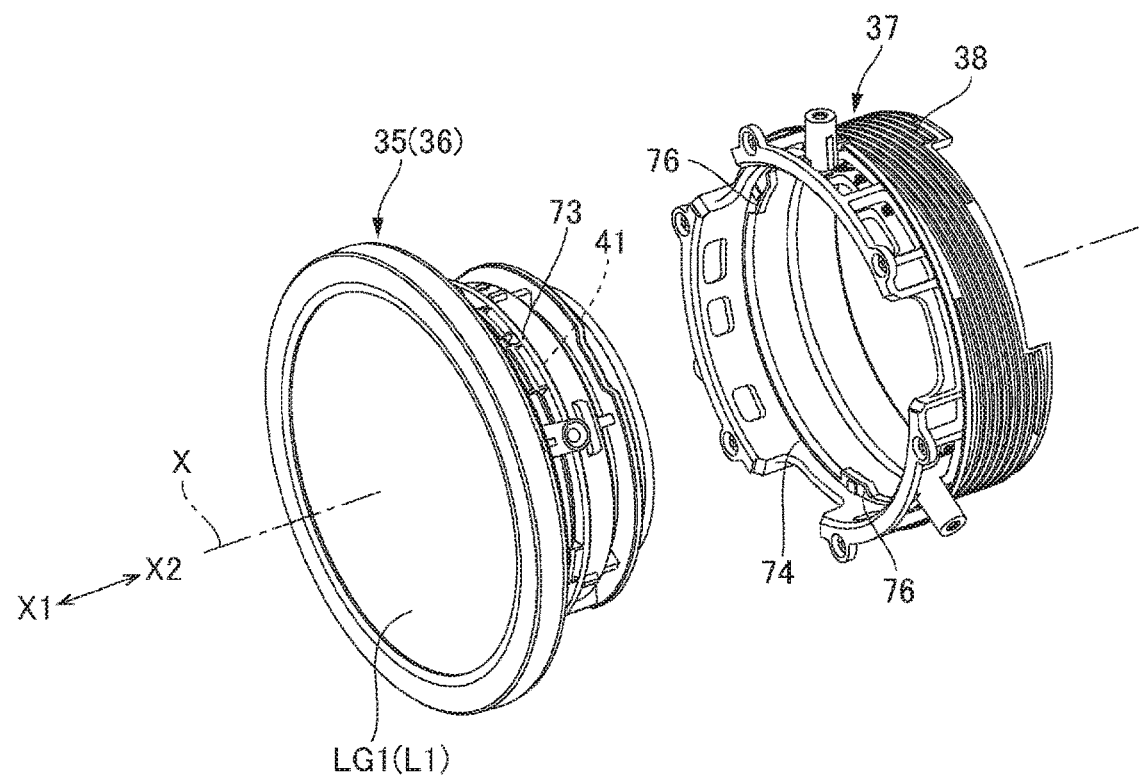
FIG. 8 is an exploded perspective view of the first lens group and the first lens group holding barrel.
Figure 8:
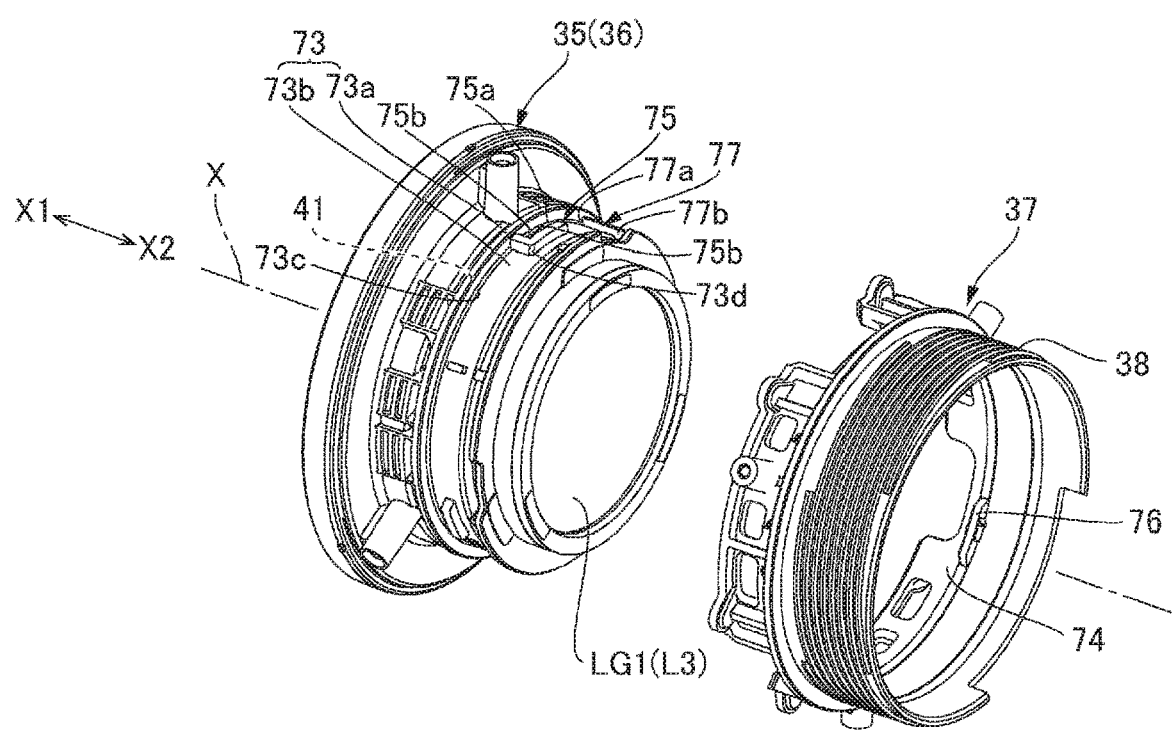

As shown in FIG. 7 and FIG. 8, the first temporarily holding mechanism 40 is provided with a holding barrel main body side outer circumferential surface part 73 opposed to the support barrel 37 on the outer circumferential surface of the holding barrel main body 36, and a support barrel side inner circumferential surface part 74 opposed to the holding barrel main body side outer circumferential surface part 73 on the inner circumferential surface of the support barrel 37. Further, the first temporarily holding mechanism 40 is provided with first circular arc grooves 75 disposed in the holding barrel main body side outer circumferential surface part 73 and extending in the circumferential direction around the optical axis X, and first projections 76 disposed in the support barrel side inner circumferential surface part 74 and inserted in the respective first circular arc grooves 75. In the holding barrel main body side outer circumferential surface part 73, the first circular arc grooves 75 are disposed at three places separated at regular angular intervals around the optical axis X. The first projections 76 each project toward the inner circumference from the support barrel side inner circumferential surface part 74. In the support barrel side inner circumferential surface part 74, the first projections 76 are disposed at three places separated at regular angular intervals around the optical axis X. It should be noted that in the present embodiment, as shown in the drawing in the lower part of FIG. 8, the holding barrel main body side outer circumferential surface part 73 is provided with a large-diameter part 73a and a small-diameter part 73b smaller in outer diameter than the large-diameter part 73a from the front side X1 toward the rear side X2. The first circular arc grooves 75 are each sectioned by a part in the circumferential direction of a rear end surface 73c having a ring-like shape facing to the rear side on the outer circumferential side of the small-diameter part 73b in the large-diameter part 73a, and a groove forming rib 73d projecting from the small-diameter part 73b toward the outer circumference. An end on the outer circumferential side of the groove forming rib 73d is located on the inner circumferential side of the outer circumferential surface of the large-diameter part 73a.

Further, as shown in the drawing in the lower part of FIG. 8, the holding barrel main body side outer circumferential surface part 73 is provided with introduction parts 77 for introducing the first projections 76 into the first circular arc grooves 75, respectively. The introduction parts 77 are each provided with a cutout part 77a disposed in a part in the circumferential direction of the first circular arc groove 75. Further, the introduction parts 77 are each provided with an introduction rib 77b for guiding the first projection 76 to the cutout part 77a. The introduction rib 77b extends from the first circular arc groove 75 toward the rear side X2. The introduction parts 77 and the first circular arc grooves 75 of the holding barrel main body 36 constitute a first bayonet mechanism 78 together with the first projections 76 of the support barrel 37. Therefore, by aligning the angular positions around the optical axis X of each of the introduction parts 77 and corresponding one of the first projections 76 with each other and moving the holding barrel main body 36 and the support barrel 37 in a direction in which the holding barrel main body 36 and the support barrel 37 approach each other, and then rotating the holding barrel main body 36 and the support barrel 37 relatively to each other around the optical axis X, it is possible to easily insert the first projections 76 into the first circular arc grooves 75, respectively. Further, according to this configuration, it is possible to prevent the holding barrel main body 36 from dropping from the support barrel 37 in the direction of the optical axis X.

Here, as shown in FIG. 7, a gap S1 is provided between the holding barrel main body side outer circumferential surface part 73 (the large-diameter part 73a) and the support barrel side inner circumferential surface part 74. Specifically, the outer diameter of the holding barrel main body side outer circumferential surface part 73 (the large-diameter part 73a) is slightly smaller than the inner diameter of the support barrel side inner circumferential surface part 74, and when making the holding barrel main body side outer circumferential surface part 73 and the support barrel side inner circumferential surface part 74 be opposed to each other, the gap S1 is formed between these parts. Further, a gap S2 is provided between a bottom surface 75a of at least one of the first circular arc grooves 75 and the tip of the first projection 76 inserted in that first circular arc groove 75. Further, the width dimension in the direction of the optical axis X of the first circular arc groove 75 is larger than the thickness dimension in the direction of the optical axis X of the first projection 76. Therefore, a gap S3 is provided between the first projection 76 and at least one of a pair of side wall surfaces 75b opposed to each other in the direction of the optical axis X in the first circular arc groove 75.

Due to these gaps S1, S2 and S3, the holding barrel main body 36 is supported by the support barrel 37 with a backlash. Therefore, the holding barrel main body 36 for holding the first lens group LG1 is allowed to be displaced with respect to the outer barrel 33 (the support barrel 37 held by the guide barrel 52). Therefore, in a manufacturing process of the projection lens 3, it is possible to perform alignment (a shift adjustment) for displacing the first lens group LG1 in directions perpendicular to the optical axis X, alignment (tilt alignment) for displacing the first lens group LG1 in a direction tilted from the plane perpendicular to the optical axis X, and alignment (a back and forth adjustment) for displacing the first lens group LG1 in the direction of the optical axis X.

The first adhesive 41 is applied on the outer circumferential surface of the holding barrel main body side outer circumferential surface part 73 to bond to fix the holding barrel main body 36 (the first lens group holding barrel 35) and the support barrel 37 (the outer barrel 33) to each other. The first adhesive 41 is an ultraviolet cure adhesive. The first adhesive 41 is set to a hardened state after completion of the alignment of the first lens group LG1, and thus, fixes the holding barrel main body 36 and the support barrel 37 to each other. Thus, the first lens group LG1 having been aligned is prevented from being displaced afterward.

Second Temporarily Holding Mechanism and Second Adhesive

Figure 9:
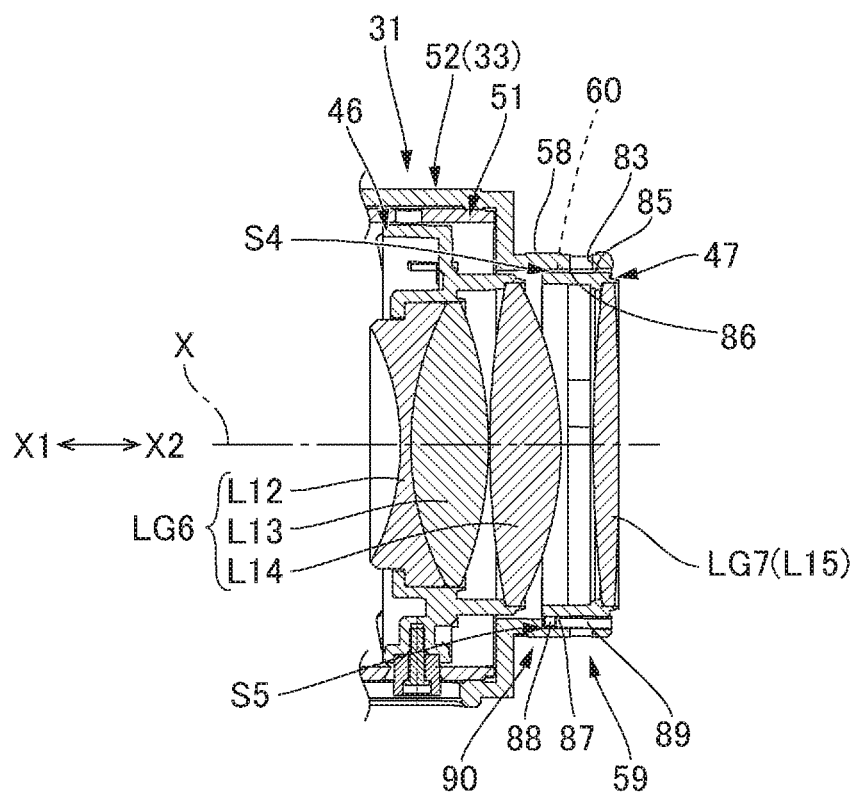
FIG. 9 is a partial cross-sectional view of a rear part of the projection lens.
Figure 10:
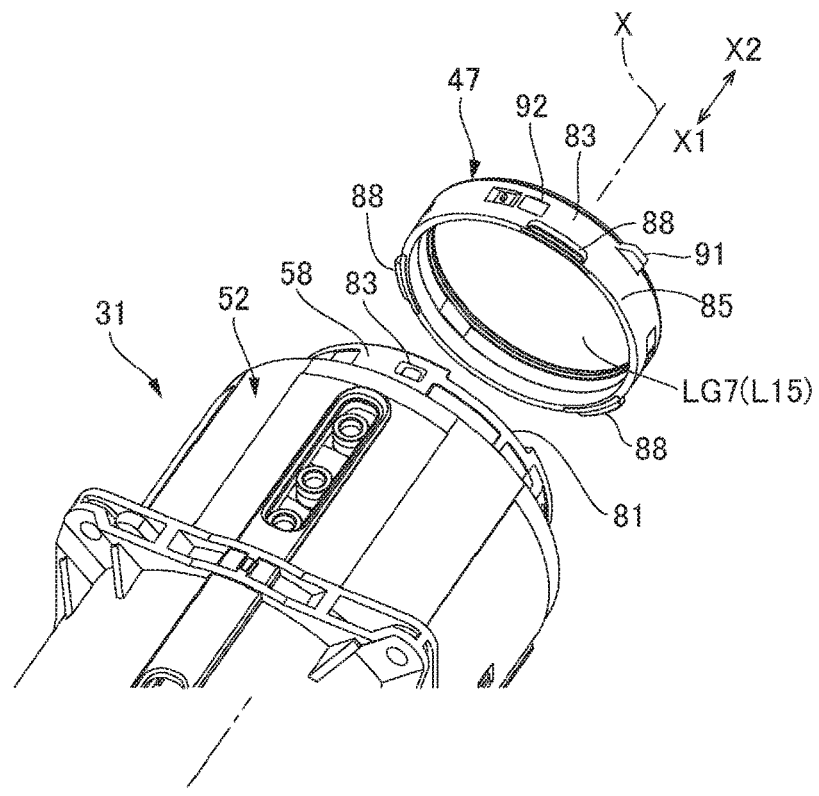
FIG. 10 is an exploded perspective view of the rear part of the projection lens.
Figure 10:
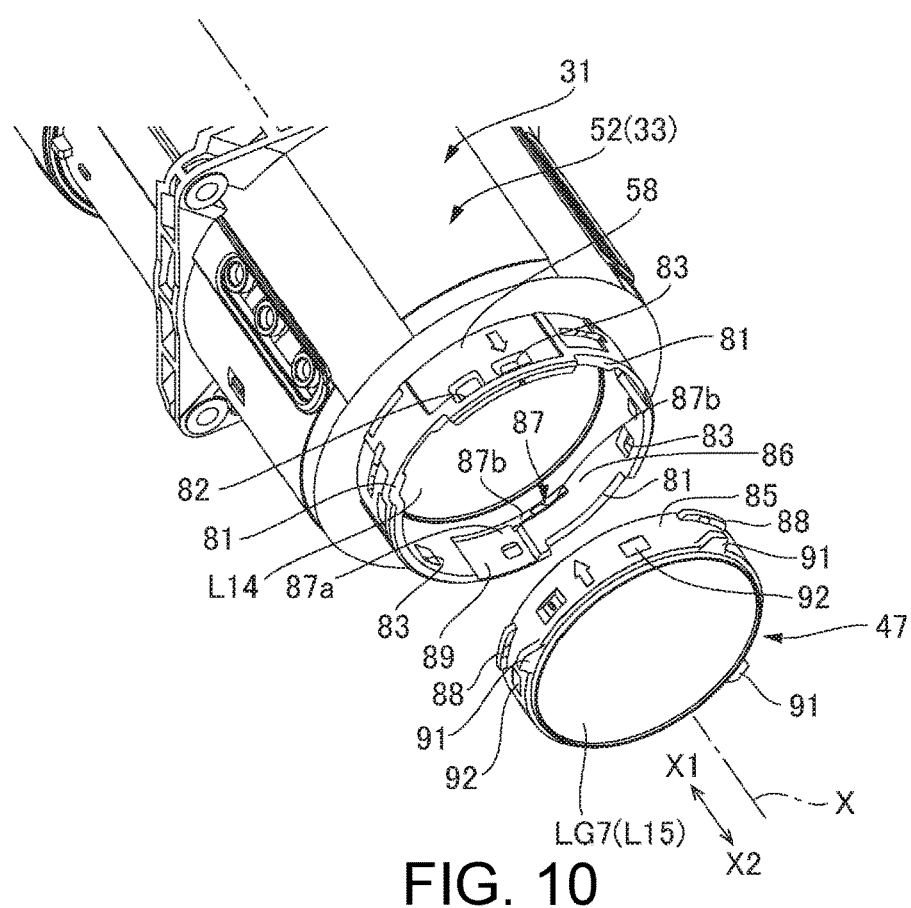

Then the second temporarily holding mechanism 59 will be described with reference to FIG. 9 and FIG. 10. FIG. 9 is a partial cross-sectional view of the rear part of the projection lens 3. The drawing in the upper part of FIG. 10 is an exploded perspective view of the rear part of the projection lens 3, the seventh lens group LG7 and the seventh lens group holding barrel 47 viewed from the front side X1, and the drawing in the lower part is an exploded perspective view of the rear part of the guide barrel 52, the seventh lens group LG7 and the seventh lens group holding barrel 47 viewed from the rear side X2.

As shown in FIG. 9, the seventh lens group holding barrel 47 is supported by the guide barrel 52 (the outer barrel 33) in the state of being almost entirely located on the inner circumferential side of the small-diameter barrel part 58 of the guide barrel 52. As shown in FIG. 10, the small-diameter barrel part 58 is provided with cutout parts 81 each shaped like a circular arc extending in the circumferential direction in a rear edge thereof. In the small-diameter barrel part 58, the cutout parts 81 are disposed at three places separated at regular angular intervals around the optical axis X. Further, the small-diameter barrel part 58 is provided with adhesive-through holes 82 for injecting the second adhesive 60 into parts overlapping the seventh lens group holding barrel when viewed from the radial direction. Two or more adhesive-through holes 82 are provided. Further, the small-diameter barrel part 58 is provided with aligning pin-through holes 83 for inserting aligning pins (not shown) into parts overlapping the seventh lens group holding barrel when viewed from the radial direction. In the small-diameter barrel part 58, the aligning pin-through holes 83 are disposed at three places separated at regular angular intervals around the optical axis X.

As shown in FIG. 9, the second temporarily holding mechanism 59 is provided with a holding barrel side outer circumferential surface part 85 opposed to the small-diameter barrel part 58 of the guide barrel 52 on the outer circumferential surface of the seventh lens group holding barrel 47, and a guide barrel side inner circumferential surface part 86 (an outer barrel side inner circumferential surface part) opposed to the holding barrel side outer circumferential surface part 85 on the inner circumferential surface of the small-diameter barrel part 58. Further, the second temporarily holding mechanism 59 is provided with second circular arc grooves 87 disposed in the guide barrel side inner circumferential surface part 86 and extending in the circumferential direction around the optical axis X, and second projections 88 disposed in the holding barrel side outer circumferential surface part 85 and inserted in the respective second circular arc grooves 87. In the guide barrel side inner circumferential surface part 86, the second circular arc grooves 87 are disposed at three places separated at regular angular intervals around the optical axis X. The second projections 88 each project toward the outer circumference from the holding barrel side outer circumferential surface part 85. In the holding barrel side outer circumferential surface part 85, the second projections 88 are disposed at three places separated at regular angular intervals around the optical axis X.

As shown in the drawing in the lower part of FIG. 8, the guide barrel side inner circumferential surface part 86 is provided with introduction grooves 89 for introducing the second projections 88 into the second circular arc grooves 87, respectively. The introduction grooves 89 each extend from a part in the circumferential direction of the second circular arc groove 87 toward the rear side X2 in the direction of the optical axis X, and open at the rear edge of the small-diameter barrel part 58. The introduction grooves 89 and the second circular arc grooves 87 of the guide barrel 52 constitute a second bayonet mechanism 90 together with the second projections 88 of the seventh lens group holding barrel 47. Therefore, by aligning the angular positions around the optical axis X of each of the introduction grooves 89 and corresponding one of the second projections 88 with each other and moving the seventh lens group holding barrel 47 and the small-diameter barrel part 58 in a direction in which the seventh lens group holding barrel 47 and the small-diameter barrel part 58 approach each other, and then rotating the seventh lens group holding barrel 47 and the small-diameter barrel part 58 relatively to each other around the optical axis X, it is possible to easily insert the second projections 88 into the second circular arc grooves 87, respectively. Further, according to this configuration, the seventh lens group holding barrel 47 is prevented from dropping from the small-diameter barrel part 58 in the direction of the optical axis X.

As shown in FIG. 9, a gap S4 is provided between the holding barrel side outer circumferential surface part 85 and the guide barrel side inner circumferential surface part 86. Specifically, the outer diameter of the holding barrel side outer circumferential surface part 85 is slightly smaller than the inner diameter of the guide barrel side inner circumferential surface part 86, and when making the holding barrel side outer circumferential surface part 85 and the guide barrel side inner circumferential surface part 86 be opposed to each other, the gap S4 is formed between these parts. Further, a gap S5 is also provided between a bottom surface 87a of at least one of the second circular arc grooves 87 and the tip of the second projection 88 inserted in that second circular arc groove 87. In contrast, the second projection 88 and a pair of side wall surfaces 87b opposed to each other in the direction of the optical axis X in the second circular arc groove 87 have contact with each other, and no gap is provided therebetween.

Due to these gaps S4, S5, the seventh lens group holding barrel 47 is held by the small-diameter barrel part 58 having a backlash in directions perpendicular to the optical axis X. Further, since the second projection 88 and the pair of side wall surfaces 87b of the second circular arc groove 87 have contact with each other, the seventh lens group holding barrel 47 is held by the small-diameter barrel part 58 without a backlash in the direction of the optical axis X. Therefore, the seventh lens group holding barrel 47 for holding the seventh lens group LG7 is allowed to be displaced only in the directions perpendicular to the optical axis X with respect to the small-diameter barrel part 58 of the guide barrel 52. Therefore, in the manufacturing process of the projection lens 3, it is possible to perform the alignment (the shift adjustment) for displacing the seventh lens group LG7 in directions perpendicular to the optical axis X.

Here, the seventh lens group holding barrel 47 is provided with (see FIG. 3) protruding parts 91 protruding toward the outer circumference to be respectively inserted in the cutout parts 81 of the guide barrel 52 (the small-diameter barrel part 58). In the seventh lens group holding barrel 47, the protruding parts 91 are disposed at three places separated at regular angular intervals around the optical axis X. The protruding parts 91 are disposed in the rear end part of the seventh lens group holding barrel 47.

Further, the seventh lens group holding barrel 47 is provided with flat surfaces 92 at positions overlapping the aligning pin-through holes 83 of the guide barrel 52 (the small-diameter barrel part 58) in the case of being viewed from the radial direction in the holding barrel side outer circumferential surface part 85.

The second adhesive 60 is applied to the holding barrel side outer circumferential surface part 85 of the seventh lens group holding barrel 47 from the adhesive-through holes 82 of the small-diameter barrel part 58 to bond to fix the seventh lens group holding barrel 47 and the small-diameter barrel part 58 of the guide barrel 52 in the outer barrel 33 to each other. The second adhesive 60 is an ultraviolet cure adhesive. The second adhesive 60 is set to a hardened state after completion of the alignment of the seventh lens group LG7, and thus, fixes the seventh lens group holding barrel 47 and the small-diameter barrel part 58 to each other. Thus, the seventh lens group LG7 having been aligned is prevented from being displaced afterward.

Alignment Operation

When performing the alignment of the first lens group LG1 and the seventh lens group LG7, firstly, the lens groups LG1 through LG7 are made to be held by the lens barrel 31. Specifically, the second through sixth lens groups LG2 through LG6 are disposed on the inner circumferential side of the guide barrel 52 and the cam barrel 51. Further, the support barrel 37 is made to be held by the guide barrel 52 via the helicoid mechanism 57 to thereby constitute the outer barrel 33. Further, the holding barrel main body 36 of the first lens group holding barrel 35 is made to be held by the support barrel 37 via the first bayonet mechanism 78. When making the holding barrel main body 36 be held by the support barrel 37, the first adhesive 41 is applied to the holding barrel side outer circumferential surface part 85 of the holding barrel main body 36 constituting the first temporarily holding mechanism 40. Further, as shown in FIG. 9, the seventh lens group holding barrel 47 for holding the seventh lens group LG7 is made to be held by the small-diameter barrel part 58 of the guide barrel 52 via the second bayonet mechanism 90. When making the seventh lens group holding barrel 47 be held by the small-diameter barrel part 58, the second adhesive 60 is applied to the holding barrel side outer circumferential surface part 85 of the seventh lens group holding barrel 47 via the adhesive-through holes 82.

Here, in the present embodiment, since the seventh lend group holding barrel 47 is almost entirely held by the small-diameter barrel part 58, it is not easy for an operator to hold the holding barrel side outer circumferential surface part 85 to insert the seventh lens group holding barrel 47 into the small-diameter barrel part 58. To deal with such a problem, the seventh lens group holding barrel 47 is provided with the protruding parts 91 protruding from the holding barrel side outer circumferential surface part 85, and the small-diameter barrel part 58 is provided with the cutout parts 81 in the rear edge. Therefore, it is possible for the operator to insert the seventh lens group holding barrel from the rear side X2 on the inner circumferential side of the small-diameter barrel part 58 in the state of putting the fingers on the tips of the protruding parts 91. Further, by making the protruding parts 91 enter the cutout parts 81 from the rear side X2, it is possible to make the seventh lens group holding barrel 47 be almost entirely placed on the inner circumferential side of the small-diameter barrel part 58. Therefore, it is easy to insert the seventh lens group holding barrel 47 into the small-diameter barrel part 58.

Then, the projection lens 3 is set in an aligning device to perform the projection alignment. Specifically, an aligning image is projected on an aligning screen via the projection lens 3. Then, the holding barrel main body 36 of the first lens group holding barrel 35 is gripped with a jig to displace the holding barrel main body 36 with respect to the support barrel 37 based on the projection image projected on the aligning screen. Thus, the alignment (the shift adjustment) for displacing the first lens group LG1 in directions perpendicular to the optical axis X, the alignment (the tilt alignment) for displacing the first lens group LG1 in a direction tilted from the plane perpendicular to the optical axis X, and the alignment (the back and forth adjustment) for displacing the first lens group LG1 in the direction of the optical axis X.

Further, the aligning pins are inserted into the aligning pin-through holes 83 from the outer circumferential side of the small-diameter barrel part 58 of the guide barrel 52 to make the tips of the aligning pins have contact with the flat surfaces 92 of the holding barrel outer circumferential surface part of the seventh lens group holding barrel 47. Then, the three aligning pins are moved forward or backward to displace the seventh lens group holding barrel 47 with respect to the guide barrel 52 based on the projection image projected on the aligning screen. Thus, the alignment (the shift adjustment) for displacing the seventh lens group LG7 in directions perpendicular to the optical axis X is performed.

Subsequently, the projection lens 3 is irradiated with ultraviolet light to thereby harden the first adhesive 41 and the second adhesive 60. Thus, the holding barrel main body 36 is fixed to the support barrel 37 so as not to be displaced to thereby make the first lens group LG1 unable to be displaced. Further, the seventh lens group LG7 is fixed to the guide barrel 52 so as not to be displaced. Thus, the first lens group LG1 and the seventh lens group LG7 are fixed so as not to be displaced, and the seventh lens group LG7 is made unable to be displaced.

Functions and Advantages

In the present embodiment, the lens barrel 31 is provided with the first temporarily holding mechanism 40 making the displacement of the first lens group LG1 possible, and the second temporarily holding mechanism 59 making the displacement of the seventh lens group LG7 possible. Therefore, on the projection lens 3, it is possible to perform the alignment for displacing the first lens group LG1 and the alignment for displacing the seventh lens group LG7 in the manufacturing process thereof. Thus, it becomes possible to prevent the aberration from occurring compared to the case of performing the alignment by displacing only the first lens group LG1. Further, the lens barrel 31 is provided with the first adhesive 41 for bonding the first lens group holding barrel 35 and the outer barrel 33 to each other to fix the first lens group LG1 so as not to be displaced, and the second adhesive 60 for bonding the seventh lens group holding barrel 47 and the outer barrel 33 to each other to fix the seventh lens group LG7 so as not to be displaced. Therefore, it is possible to prevent the first lens group LG1 and the seventh lens group LG7 from being displaced after the alignment has been performed. Here, if the alignment (the shift adjustment) for displacing the seventh lens group LG7 in directions perpendicular to the optical axis X is performed, it is possible to improve the resolution performance around the center of the image to be projected.

Further, in the present embodiment, the first temporarily holding mechanism 40 makes it possible for the first lens group LG1 to be displaced in the direction of the optical axis X, and to be displaced in a direction tilted from a plane perpendicular to the optical axis X. Therefore, it is possible to perform the alignment (the shift adjustment) for displacing the first lens group LG1 in directions perpendicular to the optical axis X, the alignment (the tilt alignment) for displacing the first lens group LG1 in a direction tilted from the plane perpendicular to the optical axis X, and the alignment (the back and forth adjustment) for displacing the first lens group LG1 in the direction of the optical axis X. Further, if these alignment operations are performed on the first lens group LG1, it is possible to prevent field inclination of the projection image from occurring to thereby improve the resolution performance.

Further, in the present embodiment, the first lens group holding barrel 35 (the holding barrel main body 36) is held by the support barrel 37 via the first bayonet mechanism 78. Therefore, it is easy to insert the first projections 76 into the first circular arc grooves 75, respectively. Further, if the first projections 76 are inserted in the first circular arc grooves 75, it is possible to prevent the holding barrel main body 36 for holding the first lens group LG1 from dropping in the direction of the optical axis X from the support barrel 37 when displacing the holding barrel main body 36 with respect to the support barrel 37.

Further, in the present embodiment, the outer barrel 33 is provided with the helicoid mechanism 57 for moving the support barrel 37 with respect to the guide barrel 52. Therefore, it is possible to move the first lens group LG1 in the direction of the optical axis X for the focusing operation and so on after performing the alignment of the first lens group LG1.

Further, in the present embodiment, the seventh lens group holding barrel 47 is held by the small-diameter barrel part 58 of the guide barrel 52 via the second bayonet mechanism 90. Therefore, it is easy to insert the second projections 88 into the second circular arc grooves 87, respectively. Further, if the second projections 88 are inserted in the second circular arc grooves 87, it is possible to prevent the seventh lens group holding barrel 47 for holding the seventh lens group LG7 from dropping in the direction of the optical axis X from the guide barrel 52 when displacing the seventh lens group holding barrel 47 with respect to the guide barrel 52. Further, in the second bayonet mechanism 90, since the second projections 88 provided to the seventh lens group holding barrel 47 have contact with the pair of side wall surfaces of the second circular arc groove 87 provided to the guide barrel 52, it is possible to limit the displacement of the seventh lens group holding barrel 47 with respect to the guide barrel 52 to the directions perpendicular to the optical axis X.

Further, in the present embodiment, the small-diameter barrel part 58 of the guide barrel 52 is provided with the adhesive-through holes 82 for injecting the second adhesive 60 into the parts overlapping the seventh lens group holding barrel 47 when viewed from the radial direction. Thus, it becomes easy to apply the second adhesive 60 to the holding barrel side outer circumferential surface part 85 of the seventh lens group holding barrel 47. Therefore, it is easy to fix the seventh lens group holding barrel 47 and the guide barrel 52 to each other.

Further, the guide barrel 52 is provided with the aligning pin-through holes 83 for inserting the aligning pins into the parts overlapping the holding barrel side outer circumferential surface part 85 when viewed from the radial direction, and the holding barrel side outer circumferential surface part 85 is provided with the flat surfaces 92 at the positions overlapping the aligning pin-through holes 83 when viewed from the radial direction. Therefore, it is possible to make the tips of the aligning pins inserted in the aligning pin-through holes 83 have contact with the flat surfaces 92 of the seventh lens group holding barrel 47 to thereby displace the seventh lens group holding barrel 47 in the directions perpendicular to the optical axis X. Therefore, it is possible to accurately perform the alignment of the seventh lens group LG7.

Further, in the projector according to the present embodiment, since the aberration is prevented from occurring in the projection lens 3, it is possible to improve the resolution performance of the projection image projected via the projection lens 3.

Modified Examples

It is also possible for the first temporarily holding mechanism 40 to have a configuration in which the first projections 76 projecting toward the outer circumference are provided to the holding barrel main body side outer circumferential surface part 73 opposed to the support barrel 37 on the outer circumferential surface of the holding barrel main body 36, the first circular arc grooves 75 and the introduction parts 77 each shaped like a groove are provided to the support barrel side inner circumference surface part 74 of the support barrel 37, and the first projections 76 are respectively inserted in the first circular arc grooves 75. Further, it is also possible for the second temporarily holding mechanism 59 to have a configuration in which the second circular arc grooves 87 and the introduction grooves 89 are provided to the holding barrel side outer circumferential surface part 85 of the seventh lens group holding barrel 47, the second projections 88 projecting toward the inner circumference are provided to the guide barrel side inner circumferential surface part 86 of the guide barrel 52, and the second projections 88 are respectively inserted in the second circular arc grooves 87.

Further, in the second temporarily holding mechanism 59, it is also possible to enable the alignment (the tilt alignment) for displacing the seventh lens group LG7 in a direction tilted from the plane perpendicular to the optical axis X, and the alignment (the back and forth adjustment) for displacing the seventh lens group LG7 in the direction of the optical axis X in addition to the alignment (the shift adjustment) for displacing the seventh lens group LG7 in the directions perpendicular to the optical axis X. In this case, the width dimension in the direction of the optical axis X of the second circular arc groove 87 is set larger than the thickness dimension in the direction of the optical axis X of the second projection 88. Thus, a gap is provided between the second projection 88 and at least one of a pair of side wall surfaces 87b opposed to each other in the direction of the optical axis X in the second circular arc groove 87.

The entire disclosure of Japanese Patent Application No. 2018-013831, filed on Jan. 30, 2018 is expressly incorporated by reference herein.

What is claimed is:
1. A projection lens comprising:
a plurality of lens groups each formed of at least one lens; and
a lens barrel adapted to support each of the lens groups from an outer circumferential side,
wherein the lens barrel includes
a first lens group holding barrel adapted to hold a first lens group located on an extreme enlargement side from the outer circumferential side,
a final lens group holding barrel adapted to hold a final lens group located on an extreme reduction side from the outer circumferential side,
an outer barrel adapted to hold the first lens group holding barrel and the final lens group holding barrel from an outer circumferential side,
a first temporarily holding mechanism adapted to allow the first lens group to be displaced in a direction perpendicular to an optical axis,
a first adhesive adapted to bond the first lens group holding barrel and the outer barrel to each other to make the first lens group unable to be displaced,
a second temporarily holding mechanism adapted to allow the final lens group to be displaced in a direction perpendicular to the optical axis, and
a second adhesive adapted to bond the final lens group holding barrel and the outer barrel to each other to make the final lens group unable to be displaced.

2. The projection lens according to claim 1, wherein
the first temporarily holding mechanism allows the first lens group to be displaced in a direction of the optical axis, and allows the first lens group to be displaced in a direction tilted from a plane perpendicular to the optical axis.

3. The projection lens according to claim 2, wherein
the first lens group holding barrel includes a holding barrel main body adapted to hold the first lens group,
the outer barrel includes a support barrel adapted to hold the holding barrel main body from the outer circumferential side,
the first temporarily holding mechanism includes
a holding barrel main body side outer circumferential surface part opposed to the support barrel on an outer circumferential surface of the holding barrel main body,
a support barrel side inner circumferential surface part opposed to the holding barrel main body side outer circumferential surface part on an inner circumferential surface of the support barrel,
a first circular arc groove disposed in one of the holding barrel main body side outer circumferential surface part and the support barrel side inner circumferential surface part, and extending in a circumferential direction around the optical axis, and
a first projection disposed in the other of the holding barrel main body side outer circumferential surface part and the support barrel side inner circumferential surface part, and inserted in the first circular arc groove,
a gap is provided between the holding barrel main body side outer circumferential surface part and the support barrel side inner circumferential surface part,
a gap is provided between a bottom surface of the first circular arc groove and a tip of the first projection,
a gap is provided between the first projection and at least one of a pair of side wall surfaces opposed to each other in the direction of the optical axis in the first circular arc groove, and
the first adhesive fixes the holding barrel main body and the support barrel.

4. The projection lens according to claim 3, wherein
the outer barrel has a helicoid mechanism adapted to displace the first lens group holding barrel, and
the helicoid mechanism includes
an external thread disposed on an outer circumferential surface of the support barrel, and
an internal thread disposed on an inner circumferential surface opposed to the outer circumferential surface of the support barrel, and is screwed in the external thread.

5. The projection lens according to claim 4, wherein
the second temporarily holding mechanism includes
a holding barrel side outer circumferential surface part opposed to the outer barrel on an outer circumferential surface of the final lens group holding barrel,
an outer barrel side inner circumferential surface part opposed to the holding barrel side outer circumferential surface part on an inner circumferential surface of the outer barrel,
a second circular arc groove disposed in one of the holding barrel side outer circumferential surface part and the outer barrel side inner circumferential surface part, and extending in a circumferential direction around the optical axis, and
a second projection disposed in the other of the holding barrel side outer circumferential surface part and the outer barrel side inner circumferential surface part, and inserted in the second circular arc groove, a gap is provided between the holding barrel side outer circumferential surface part and the outer barrel side inner circumferential surface part, a gap is provided between a bottom surface of the second circular arc groove and a tip of the second projection, a pair of side wall surfaces of the second circular arc groove opposed to each other in the direction of the optical axis and the second projection have contact with each other, and the second adhesive fixes the final lens group holding barrel and the outer barrel.

6. The projection lens according to claim 5, wherein the second circular arc groove is disposed in the outer barrel side inner circumferential surface part, the second projection is disposed in the holding barrel side outer circumferential surface part, the outer barrel side inner circumferential surface part is provided with an introduction groove adapted to introduce the second projection into the second circular arc groove, and the introduction groove extends from a part in a circumferential direction of the second circular arc groove toward the reduction side in the direction of the optical axis, and opens in an edge on the reduction side of the outer barrel.

7. The projection lens according to claim 5, wherein
the outer barrel is provided with an adhesive-through hole adapted to inject the second adhesive into a part overlapping the final lens group holding barrel when viewed from a radial direction perpendicular to the optical axis.

8. The projection lens according to claim 5, wherein
the outer barrel is provided with an aligning pin-through hole adapted to insert an aligning pin into a part overlapping the holding barrel side outer circumferential surface part when viewed from a redial direction perpendicular to the optical axis, and the holding barrel side outer circumferential surface part is provided with a flat surface at a position overlapping the aligning pin-through hole when viewed from the radial direction.

9. The projection lens according to claim 5, wherein
the outer barrel is provided with a cutout part shaped like a circular arc extending in a circumferential direction in an edge on the reduction side, and the final lens group holding barrel is provided with a protruding part protruding toward an outer circumference and inserted in the cutout part.

10. The projection lens according to claim 3, further comprising:
an intermediate lens group located between the first lens group and the final lens group in the direction of the optical axis, wherein the lens barrel includes
an intermediate lens group holding barrel adapted to hold the intermediate lens group from an outer circumferential side, and
a cam barrel located between the intermediate lens group holding barrel and the outer barrel, and adapted to support the intermediate lens group holding barrel so as to be movable in the direction of the optical axis, the intermediate lens group holding barrel is provided with a guide pin projecting outward, the cam barrel is provided with a cam hole tilted in the direction of the optical axis toward a circumferential direction, the outer barrel supports the cam barrel so as to be rotatable around the optical axis, and is provided with a guide groove extending in the direction of the optical axis in an inner circumferential surface, and the guide pin penetrates the cam hole and is inserted in the guide groove.

11. The projection lens according to claim 1, wherein
the second temporarily holding mechanism allows the final lens group to be displaced in the direction of the optical axis, and allows the final lens group to be displaced in a direction tilted from a plane perpendicular to the optical axis.

12. A projector comprising:
the injection lens according to claim 1; and
an image display element,
wherein an image displayed on the image display element is projected by the projection lens.

13. A projector comprising:
the injection lens according to claim 2; and
an image display element,
wherein an image displayed on the image display element is projected by the projection lens.

14. A projector comprising:
the injection lens according to claim 3; and
an image display element,
wherein an image displayed on the image display element is projected by the projection lens.

15. A projector comprising:
the injection lens according to claim 4; and
an image display element,
wherein an image displayed on the image display element is projected by the projection lens.

16. A projector comprising:
the injection lens according to claim 5; and
an image display element,
wherein an image displayed on the image display element is projected by the projection lens.

17. A projector comprising:
the injection lens according to claim 6; and
an image display element,
wherein an image displayed on the image display element is projected by the projection lens.

18. A projector comprising:
the injection lens according to claim 7; and
an image display element,
wherein an image displayed on the image display element is projected by the projection lens.

19. A projector comprising:
the injection lens according to claim 8; and
an image display element,
wherein an image displayed on the image display element is projected by the projection lens.

20. A projector comprising:
the injection lens according to claim 9; and
an image display element,
wherein an image displayed on the image display element is projected by the projection lens.

* * * * *